US011054053B2

(12) United States Patent
Mitzler et al.

(10) Patent No.: US 11,054,053 B2
(45) Date of Patent: Jul. 6, 2021

(54) VALVE AND VALVE ARRANGEMENT

(71) Applicant: Alfmeier Präzision SE, Treuchtlingen (DE)

(72) Inventors: Matthias Mitzler, Graben (DE); Erich Dörfler, Landsberg (DE); Klaus Beetz, Weissenburg (DE); Wolfgang Beyerlein, Mitteleschenbach (DE)

(73) Assignee: Alfmeier Präzision SE, Treuchtlingen (DE)

( * ) Notice: Subject to any disclaimer, the term of this patent is extended or adjusted under 35 U.S.C. 154(b) by 173 days.

(21) Appl. No.: 16/038,289

(22) Filed: Jul. 18, 2018

(65) Prior Publication Data

US 2019/0049033 A1 Feb. 14, 2019

(30) Foreign Application Priority Data

Jul. 25, 2017 (DE) ...................... 10 2017 116 841.9

(51) Int. Cl.
*F16K 31/02* (2006.01)
*F16K 1/20* (2006.01)
(Continued)

(52) U.S. Cl.
CPC ............ *F16K 31/025* (2013.01); *B60N 2/914* (2018.02); *F16K 1/205* (2013.01); *F16K 1/2007* (2013.01); *F16K 11/20* (2013.01)

(58) Field of Classification Search
CPC ...... F16K 31/02; F16K 31/025; F16K 31/004; F16K 31/046; F16K 1/205; F16K 1/2007;
(Continued)

(56) References Cited

U.S. PATENT DOCUMENTS 7,484,528 B2 * 2/2009 Beyerlein ............. F16K 31/002
137/596
9,958,081 B2 * 5/2018 Deperraz ............. F16K 31/002
(Continued)

FOREIGN PATENT DOCUMENTS

CN 102459977 5/2012
CN 105121928 12/2015
(Continued)

OTHER PUBLICATIONS

Search Report for Chinese Patent Application No. CN201810826668X dated Sep. 22, 2019.

*Primary Examiner* — Craig J Price
*Assistant Examiner* — Andrew J Rost
(74) *Attorney, Agent, or Firm* — JK Intellectual Property Law, PA

(57) ABSTRACT

A valve has a valve housing with a lid, bottom, and an intermediate housing portion between the lid bottom. The valve housing encloses a valve chamber, a flow chamber, and an actuation chamber, with at least one valve opening leading from the flow chamber to the actuation chamber. Inside the actuation chamber at least one axially movable actuator movable between a closing position to close the valve opening and an opening position to release the valve opening, one wire- or band-shaped SMA element made of a shape memory alloy to activate the actuator in the opening direction, one return element to move the actuator in closing direction, and one printed circuit board. The SMA element is attached to the actuator at a middle section and is electrically connected at its ends to the printed circuit board to be supplied with an electrical current.

19 Claims, 11 Drawing Sheets

(51) Int. Cl.
*F16K 11/20* (2006.01)
*B60N 2/90* (2018.01)

(58) Field of Classification Search
CPC .......... F16K 11/20; F16K 11/02; F16K 27/08;
B60N 2/914; B60N 2/976
See application file for complete search history.

(56) References Cited

U.S. PATENT DOCUMENTS

| | | | |
|---|---|---|---|
| 10,337,635 B2* | 7/2019 | Asai ................... | F16K 31/025 |
| 2005/0121636 A1* | 6/2005 | Scott ................... | F16K 31/025 |
| | | | 251/129.06 |
| 2014/0103232 A1* | 4/2014 | Deperraz ............. | F16K 11/10 |
| | | | 251/11 |
| 2016/0157669 A1* | 6/2016 | Andreis ............... | A47J 31/461 |
| | | | 222/129.1 |
| 2019/0056040 A1* | 2/2019 | Mitzler ................ | F16K 31/02 |

FOREIGN PATENT DOCUMENTS

| | | |
|---|---|---|
| DE | 202010010747 | 10/2010 |
| GB | 2543052 | 4/2017 |
| JP | H01316578 | 12/1989 |
| JP | 2007315529 | 12/2007 |

* cited by examiner

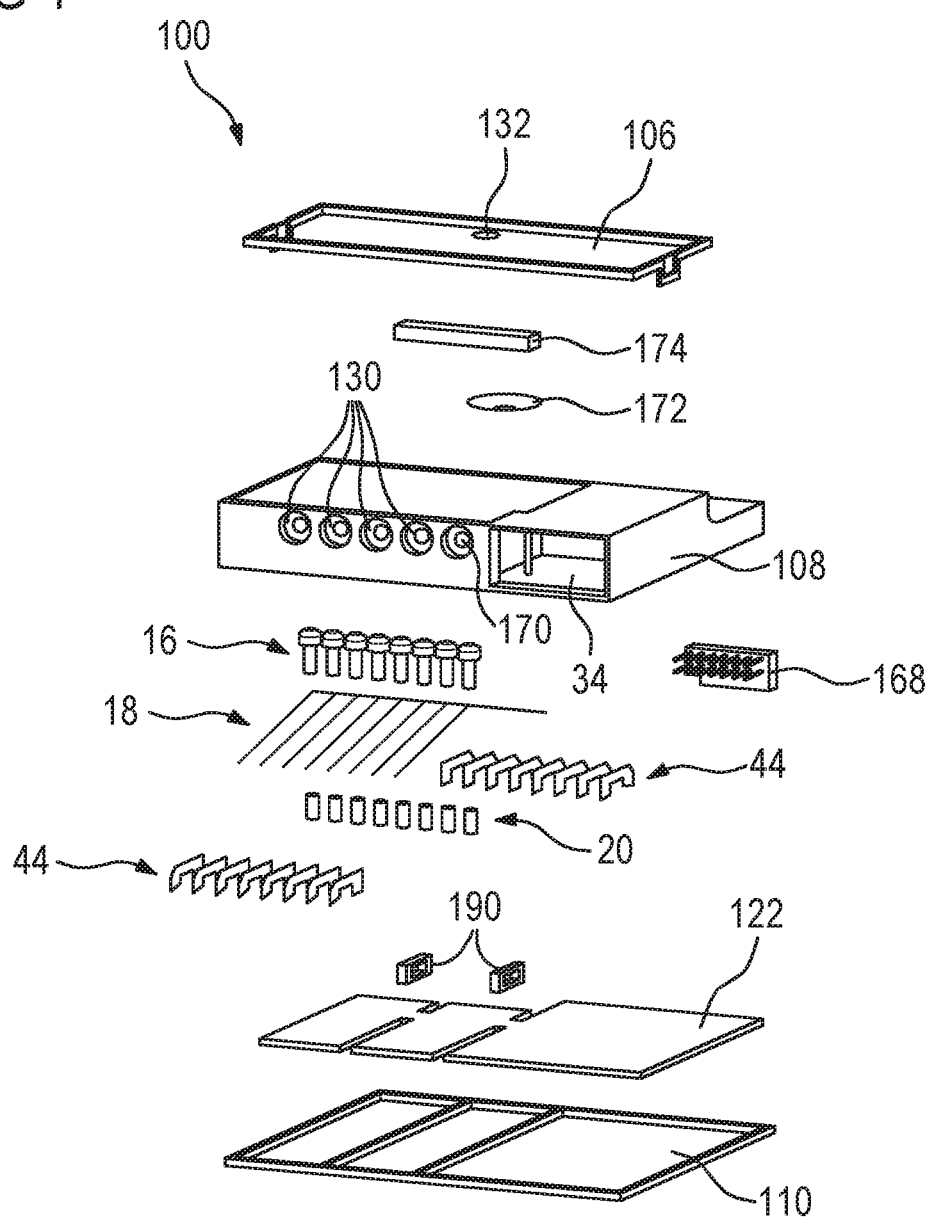

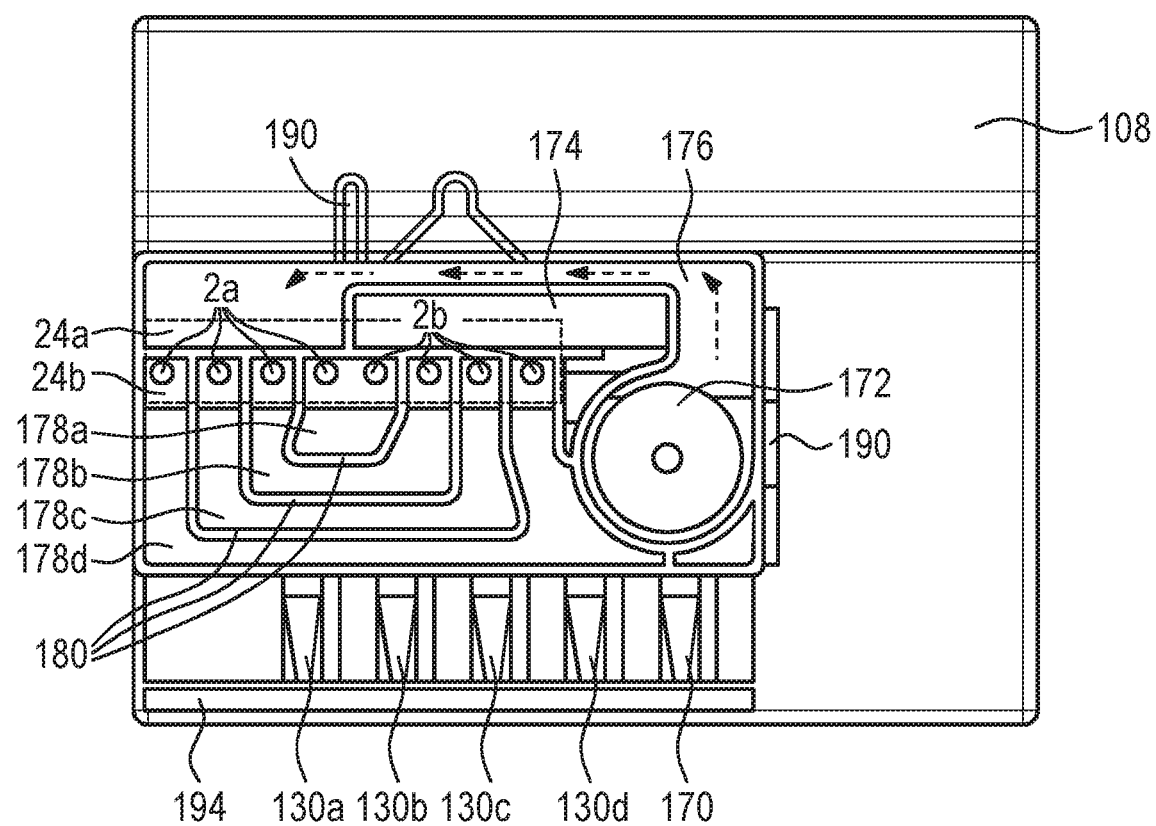

VALVE AND VALVE ARRANGEMENT

CROSS-REFERENCE TO RELATED APPLICATION

This application claims benefit to German Patent Application Number 10 2017 116 841.9, filed Jul. 25, 2017 which is incorporated by reference herein in its entirety.

TECHNICAL FIELD

The disclosure refers to a valve with a valve housing that encloses a valve space and has at least one valve opening. To activate such a valve, an actuator, arranged inside the valve space, can be moved between a closing position to close the valve opening and an opening position to release the valve opening. The disclosure also refers to a valve arrangement with several valves.

BACKGROUND

The movement of the actuator between the opening and closing position can take place with the help of shape memory alloys (SMA) that can be shaped like wires, for example. In this case, they are alloys that depending on their temperature can exist in two different crystalline structures. At room temperature, there is a martensitic structure with a tetragonal body-centered lattice, which starting at a transformation temperature of about 80° C., undergoes a transformation to become an austenitic structure with a cubic face-centered lattice. Therefore, a wire from such a shape memory alloy has the property to shorten when heated up via the transformation temperature owing to the transformation of the lattice from a martensitic to an austenitic structure. To heat up the SMA element, an electric current is usually applied on it, thereby shortening it so it can thus move the actuator.

It is known from DE 10 2005 060 217, for example, that a stem for opening and closing a valve opening is arranged inside the pressure chamber of a valve with a valve housing that encloses the pressure chamber. Here, the stem is activated to move the valve opening by an SMA element, which is electrically connected to a printed circuit board arranged inside the valve housing so an electric current can be applied. The SMA element is arranged inside the pressure chamber and therefore directly exposed to the valve's volume flow, i.e. to the air flowing in or out of the pressure chamber through the valve openings. However, for activating the SMA element or the stem's activation caused as a result of that, a very narrow temperature range must be adjusted, which is difficult due to the changing volume flows or temperatures. Therefore, the valve or valve opening cannot, on the one hand, be sufficiently opened. On the other hand, the wire-shaped SMA element can overheat and thus be damaged. As a result of this, the service life of the SMA element and therefore of the valve is shortened. In addition, the air flow can cool a part of the length of the SMA element and this causes the SMA element to heat up irregularly. This, in turn, causes it to asymmetrically shorten and thus the stem is possibly not activated in a straight line.

SUMMARY

It is therefore the task of the disclosed subject matter to provide an improved valve and a valve arrangement, with respect to the above-mentioned disadvantages.

The task mentioned first is solved by a valve having the characteristics according to disclosed subject matter. The valve has a valve housing that comprises a housing lid, a housing bottom and an intermediate housing arranged between the housing lid and the housing bottom. The valve housing encloses a valve chamber that includes a flow chamber and an actuation chamber, wherein the valve housing hast at least one valve opening leading from the actuation chamber to the flow chamber. Here, the valve chamber is understood to all of the valve's interior enclosed by the valve housing. Inside the actuation chamber there are at least one axially movable actuator that moves between a closing position to close the valve opening and an opening position to release the valve opening, one wire- or band-shaped SMA element made of a shape memory alloy that serves to move the actuator in opening direction or stroke direction, one return element that serves to move the actuator in closing direction or return direction, and one printed circuit board. So it can activate the actuator, the SMA element is attached to the actuator with a middle section and directly or indirectly electrically connected with its ends to the printed circuit board so electric current can be applied to it. The flow chamber and the actuation chamber are fluidically separated from one another in such a way by a separating wall having a valve opening that a fluid flowing through the valve is guided through the flow chamber when the actuator is activated.

Thus, the disclosed concept consists of fluidically dividing the valve chamber through which a fluid, especially air, flows, into two partial chambers essentially separated from one another, namely one actuation chamber or actuator space that contains all components necessary for activating the valve or opening the valve opening are arranged, and one flow chamber through which the fluid can flow through. This has the advantage that the main flow of the flowing fluid merely flows through the flow chamber and thus not by the components necessary for activating the valve opening, especially the SMA elements, or the main flow is led to an area separated from the SMA elements. As a result of this, the temperature of the SMA elements can be adjusted and controlled more exactly because the warming and cooling of the SMA elements takes place largely independently from the fluid flowing through the valve. In addition, due to the uniform but reduced cooling, lower current strength is necessary for supplying the SMA element with an electrical current or activating the actuator, thereby increasing the service life of the SMA element. The separate guiding of the fluid's flow achieves a uniform flow of the fluid, lower pneumatic resistance and noise optimization.

Advantageously, a first area of the flow chamber and a second area of the flow chamber are connected to one another by the valve opening and/or a connecting channel, wherein the valve opening and/or the connecting channel are closed in the closing position of the actuator and released in the opening position of the actuator. Thus, the first and second area of the flow chamber are arranged on different sides of the valve opening and connected to one another via a connecting channel or a connecting area, wherein the first and the second area are connected to one another merely fluidically when the valve opening is open. Here, the connecting channel is understood to be the valve area between the actuator for closing and releasing the valve opening and the sealing seat surrounding the valve opening, which completely surrounds the actuator, for example. When the valve opening is closed, the connecting channel is connected to one of the two areas of the flow chambers, so that the fluid is also distributed inside the connecting channel or valve area.

To supply air to the flow chamber, the first area of the flow chamber is preferably connected or can be connected to an air supply unit or the valve has a pressure connection ending in the first area of the flow chamber. The second area of the flow chamber is or can be connected to a media reservoir (which can be an air cushion of a vehicle seat with contour adjustment) or has a consumer connection ending in the second area of the flow chamber, so that the media reservoir can be filled with air when the valve is open. To let air out of the flow chamber, i.e. to empty the media reservoir, the flow chamber has an opening to the atmosphere and/or is or can be connected to the atmosphere through an opening. When the valve opening is open, a fluid especially air starts flowing through the flow chamber, specifically when the media reservoir is filled with air, for example, from the first area of the flow chamber connected to the air supply unit, through the connecting channel and into the second area of the flow chamber and to the media reservoir. When the media reservoir is emptied, the fluid flows back to the flow chamber and from there out of the valve through the opening to the atmosphere. The opening is preferably executed in the housing lid that borders the flow chamber on the top side.

In a preferred embodiment of the valve, the separating wall that separates the flow chamber and the actuation chamber from one another is formed by the valve's intermediate housing, i.e. is executed as one piece with it. Thus, the flow chamber is advantageously formed or partially enclosed by the intermediate housing and closed by the housing lid on the top side and/or the actuation chamber is formed by the intermediate chamber or partially enclosed and on the bottom side closed by the housing bottom. This has the advantage that no additional, separate components are necessary to execute the two chambers, thereby achieving economical manufacturing and easy valve assembly. To reduce the number of components necessary for making the valve functional even more, in an advantageous embodiment the pressure connection and the guiding elements to guide the actuator and/or fastening devices to fix the printed circuit board in place inside the valve housing are also executed as one piece with the intermediate housing or integrated into it.

In a preferred embodiment, the flow chamber and the actuation chamber are fluidically connected via at least one air gap. In this case, the air gap or fluid channel is especially arranged in an area surrounding the valve opening, leading especially from the flow chamber, particularly from the connecting channel or the valve area of the flow chamber and/or the first area of the flow chamber, to the actuation chamber. Although pressure equalization between the flow chamber and actuation chamber is ensured by the fluidic connection of the flow chamber and the actuation chamber by the at least one fluid channel or air gap even with a closed valve opening, merely a secondary current of the fluid flows into the actuation chamber and thus around the SMA elements. Due to the small volume of the actuation chamber, the pressure is quickly equalized. If the actuator is activated and the valve opening opened, a main current of the fluid flows almost exclusively through the flow chamber (i.e. through the first area), connecting channel and valve opening as well as second area. As a result of this, no pneumatic forces act on the actuator or the SMA element. In addition, owing to the constant air exchange, the at least one air gap prevents the heat from accumulating inside the actuation chamber. Moreover, the active, but controlled cooling allows short valve switching times to be achieved. Because the air gap is arranged in an area surrounding the valve opening, especially symmetrically, a uniform cooling and thus a uniform contraction of the usually symmetrically arranged SMA elements around the valve opening is achieved, since the secondary current of the fluid is homogenously distributed in the actuation chamber. When the valve opening is open, the main current keeps flowing almost exclusively through the flow chamber, to be more precise, from its first area through the connecting channel and the valve opening to its second area and vice versa. To ensure this, in an advantageous embodiment, a cross section of the at least one air gap is smaller than the opening cross section of the connecting channel and/or valve opening between the first area and the second area of the flow chamber. Moreover, the opening cross section of the at least one air gap has advantageously been selected in such a way that a cooling of the SMA element takes place proportionally to the volume flow of the fluid flowing into the actuation chamber, thereby the cooling of the SMA elements is regulated by the opening cross section. Furthermore, as a result of this, a strong cooling of the SMA elements and strong turbulences inside the actuation chamber are prevented.

In a preferred embodiment, the separating wall has an intermediate wall that encloses, at least partially, the valve opening and extends into the actuation chamber in the direction of movement of the actuator, wherein the actuator, especially one of its first terminal sections facing the valve opening, is led to the receiving space, and wherein the at least one air gap leads especially from the flow chamber to the receiving space. The pressure equalization through the air gap already ensures that hardly any fluid flows around the SMA element. The formation of the receiving space and the air gap ending therein additionally ensures that if fluid flows around the SMA element at all, this occurs only in a middle section arranged on the actuator led inside the receiving space, thereby preventing a varied and extensive cooling of the SMA element over its entire length.

On the first terminal section facing the valve opening, the actuator has especially a sealing element that closes the valve opening, which to create the at least one air gap ends laterally spaced apart before the intermediate wall forming the receiving space.

So the media reservoir can be filled and vented with only one valve, in a valve variation an actuator element has been arranged inside the valve chamber, especially inside the flow chamber, especially preferably inside the second area of the flow chamber, which can be mounted in such a way that it can be rotated or swiveled on the intermediate housing and coupled with the actuator or interacting with it, so that the opening to the atmosphere is released when the actuator is in closed position and the opening is closed when the actuator is in releasing position. The actuator element has preferably a sealing element in a section facing the opening to the atmosphere and comprises a return element like a leaf spring, which pre-stresses the actuator element in the opening's closing position. With such a variation, it is possible to achieve a cyclical filling and venting of the media reservoir, thus ensuring that the valve and therefore the media reservoir are always vented when the valve's actuator is not used.

In another preferred embodiment, a second terminal section of a consumer connection that faces the second area of the flow chamber has a larger clear width than a first section facing the media reservoir, wherein especially the terminal section of the consumer connection for the media reservoir facing the flow chamber and/or the housing lid and the terminal section facing the media reservoir are formed by the intermediate housing. In other words, the terminal section of the consumer connection on which the fluid flows out of the flow chamber or flows into the consumer connection has a conical shape or is executed in a funnel shape to prevent turbulences, thus improving the flow to the media reservoir. Therefore, the pressure connection and/or the consumer connection are advantageously executed in such a way that they have a first terminal section facing away from the terminal section and tapering towards a free end, and a second terminal section facing the valve chamber, wherein the second terminal section is at least radially narrowed in circumferential direction. In other words, a free end of the pressure connection and/or of the consumer connection and/or of the connecting piece has a smaller external diameter than an end facing the valve chamber, thereby simplifying an insertion of the hose. The partially radial narrowing of the second terminal section forms a rear grip surface, wherein a hose inserted on the connecting piece can be fixed in place or secured against removal.

The task mentioned in the second place is solved by a valve arrangement having the characteristics of claim 11. The valve arrangement comprises several valves, designed in each case especially according to the preceding manner. The valve housing that encloses the valve chamber of a valve in each case, in particular the intermediate housing and/or the housing bottom, and/or the printed circuit boards, are executed as one piece. In other words, the valve chambers of all valves of the valve arrangement are enclosed by a common valve housing or a common intermediate housing and/or housing lid and/or housing bottom. Furthermore, all SMA elements of the several valves with a common printed circuit board are electrically connected. As a result of this, the number of needed parts can be significantly reduced. Such a valve arrangement is, for example, integrated into a vehicle seat with contour adjustment.

In an advantageous valve arrangement design, at least one part of the several valves has a common pressure connection that ends in each case in the valve chamber, especially in the flow chamber, especially preferably in a first area of the flow chambers or in one area of the first valve that includes the first areas of the flow chambers or is in each case connected to the valve chamber, especially the flow chamber, especially preferably the first area of the flow chamber or the area above the at least one air channel and/or at least a second part of the several valves has a common opening for connection to the atmosphere that ends especially in the first area of the flow chambers or in an area enclosing the first areas of the flow chambers or is connected via at least one air channel to the first areas of the flow chambers. In other words, the valve chambers of one part of the valves are fluidically connected to the common pressure connection, especially via air channels and/or areas or chambers or chambers integrated into the intermediate housing or formed by it, to supply air to the respective valve chambers or flow chambers, more precisely to the first area of the flow chambers of the first valve. In addition, the valve chambers of one part of the valves are connected to the atmosphere through a common opening, especially in particular once again by air channels and/or areas or chambers integrated into the intermediate housing or formed by it to release air from the corresponding valve chambers or flow chambers, more precisely into the second areas of the flow chambers of the second valve. In a vehicle seat with contour adjustment, such a valve arrangement serves to adjust the lower spine or provide lateral support, wherein in a media reservoir shaped like an air cushion, there are in each case two allocated valves that are connected to it via the consumer connection and a supply line, wherein the first valve is connected to a pneumatic pump via the pressure connection and a supply line, and the second valve is connected to the atmosphere via the opening. By opening the first valve when the second valve is simultaneously closed, the media reservoir is filled, and when both valves are closed, the air volume inside the air cushion is trapped in a gas tight way and maintained like that. The air cushion is emptied by opening the second valve when the first valve is simultaneously closed. From the consumer side, the valves allocated to a media reservoir are fluidically connected via a common air channel or a common air chamber. Thus, the first and second valves form a 3/3-way valve as a valve structural group.

In an alternative advantageous embodiment, the several valves have a common pressure connection that ends in each case in the valve chamber, especially in the flow chamber, especially preferably in the first area of the flow chamber of the valves or in an area enclosing the first areas of the flow chambers or is in each case connected to the valve chamber, especially to the flow chamber, especially preferably to the first area of the flow chambers or the area above at least one air channel, wherein each valve has a separate opening to connect the valve chamber, especially the flow chamber, to the atmosphere, which ends especially in the second area of the flow chamber. In other words, the valve chambers of all valves are fluidically connected to the common pressure connection, especially via air channels and/or areas or chambers integrated into the intermediate housing or formed by it to supply air to the respective valve chambers or flow chambers, more precisely to the first area of the flow chambers. In addition, the valve chambers of all valves are in each case connected to the atmosphere through an opening, especially once again by air channels and/or chambers or areas integrated into the intermediate housing or formed by it for letting out air out of the respective valve chambers or flow chambers, more precisely from the second areas of the flow chambers, thereby achieving a 3/2-way functionality to carry out a massaging function, for example, wherein the valve opening and the opening to the atmosphere are alternately released and closed in order to achieve a cyclical adjustment of the vehicle seat contour.

The valve's functionality, whether 3/3-way or 3/2-way functionality, is thus primarily determined here by the design of the intermediate housing, which forms the valve chambers and air channels or chambers. Thus, by selecting or replacing the intermediate housing accordingly, either a cyclical massaging function or a static adjustment function can be achieved.

For developing 3/3-way functionality, in a preferred design the valve chambers of the several valves are, on the one hand, separated from the receiving space for the electronic contacting of the printed circuit board by a separating wall executed especially as one piece with the intermediate housing. On the other hand, the valves whose valve chambers, especially their flow chambers, especially preferably their first areas are connected to the pressure connection, and the valves whose valve chambers, especially their flow chambers, especially preferable their first areas are connected to the atmosphere, separated from one another by a separating wall, wherein the separating wall is executed especially as one piece with the intermediate housing. For developing 3/2-way functionality, in a preferred design, the valve chambers of the several valves are at least separated from the receiving space for the electronic contacting of the printed circuit board by a separating wall executed especially as one piece with the intermediate housing. The several valves can be activated independently from one another in order to selectively fill or empty individual air cushions.

Here, the separating walls have, especially in the assembled state, a pneumatically sealed passage opening for the printed circuit board.

In another advantageous variation, guiding elements are arranged in such a way in an air channel leading from the air supply unit to the flow chamber(s) that a fluid flowing in or through the flow chambers has a laminar flow. Thus, a directional flow is generated, which also contributes to the prevention of turbulences capable of reducing the flow. Moreover, the noise generated inside the valve or valve arrangement is reduced as a result of this.

BRIEF DESCRIPTION OF THE DRAWINGS

The disclosed subject matter will be explained in more detail below, also with regard to additional characteristics and advantages, by describing embodiments and making references to the enclosed drawings, which show in each case in a schematic sketch:

FIG. 4 is an exploded isometric view of a valve arrangement with several valves with an intermediate housing according to a first embodiment.

FIG. 5 is a top view of the intermediate housing of a valve arrangement according to FIG. 4.

DETAILED DESCRIPTION

Figure 1A:
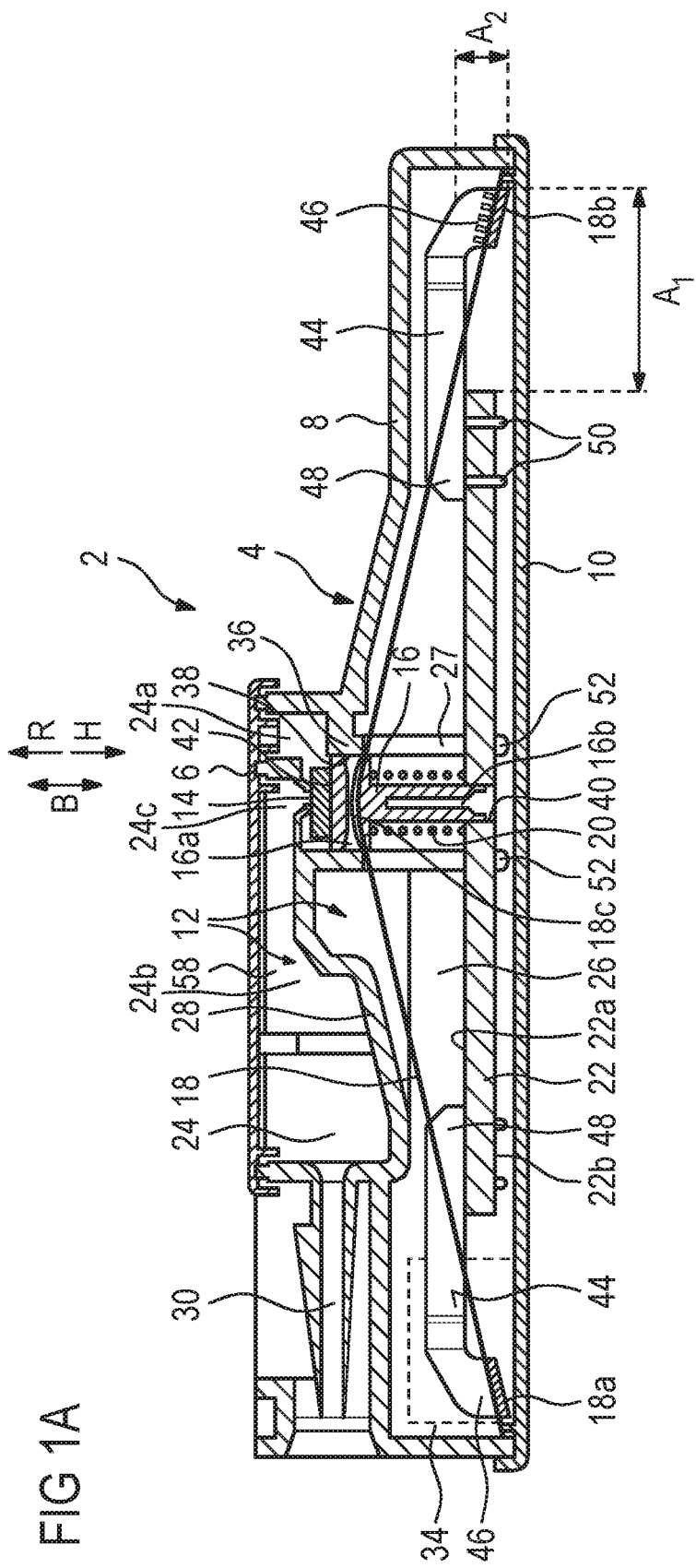
FIG. 1A is a sectional view of a valve according to a first embodiment in a closed position.

FIG. 1A shows a valve 2 with a valve housing 4, which consists of one upper housing lid 6, a lower housing bottom 10 and an intermediate housing 8 arranged between the housing lid 6 and the housing bottom 10. The valve 4 encloses a valve chamber 12, in which a valve opening 14 ends. Inside the valve chamber 12, an axially movable actuator 16 has been arranged between a closing position for closing the valve opening 14 and an opening position for releasing the valve opening 14 in a direction of movement B. A wire-shaped SMA element 18 from a shape memory alloy, held onto the actuator 16, more precisely onto its first terminal section 16a, with a middle section 18c, serves to activate the actuator 16 in an opening direction or stroke direction H. To supply an electric current, the SMA element 18 is electrically connected with its ends 18a, 18b to a printed circuit board 22 likewise arranged inside the valve chamber 12.

A return element 20, here a compression spring that concentrically surrounds a second terminal section 16b of the actuator 16, that supports itself with a first end on the printed circuit board 22 and with a second end on the first terminal section 16a of the actuator 16, which is radially widened compared to the second terminal section 16b, serves to move the actuator 16 in closing direction or return direction R.

The intermediate housing 8 comprises all components necessary for the functionality of the valve 2; in other words, all parts necessary for this are integrated into the intermediate housing 8 itself, as will be explained below.

The valve chamber 12 is subdivided into a flow chamber 24 and an actuation chamber 26, separated from one another by a separating wall 28, so that a fluid flowing through the valve 2 or the valve chamber 12 when the actuator 16 is activated merely flows through the flow chamber 24. In this case, the flow chamber 24 is formed by the intermediate housing 8 and closed by the housing lid 6 on its upper side. The actuation chamber 26 is likewise formed by the intermediate housing 8 and closed by the housing bottom 10 on its lower side, wherein the number the number of necessary components can be reduced. The actuator 16 and the components necessary for activating the actuator 16, namely the SMA element 18, the return element 20 and the printed circuit board 22, are arranged inside the actuation chamber 26. By purposefully guiding the fluid current, a non-uniform cooling of the SMA element 18 is prevented. The separating wall 28 is executed as one piece with the intermediate housing 8 or pre-formed on it. The flow chamber 24 has a first area 24a and a second area 24b connected to one another via a connecting channel 24c, which is closed in a closing position of the actuator 16 and released in an opening position of the actuator 16.

To supply air to the valve chamber 12, more precisely to the flow chamber 24, their first area 24a is connected to an air supply unit or to a pneumatic pump or to a pressure connection (not visible in FIG. 1A), which is or will be connected to the pneumatic pump via a supply line, ends directly or indirectly in the first area 24a of the flow chamber 24. By releasing the valve opening 14, the supplied air can flow from the first area 24a to the second area 24b via the connecting channel 24c pushing through the valve opening. The valve 2 serves especially to fill a media reservoir (not shown), for example an air cushion of a vehicle seat with adjustable contour. To achieve this, the valve chamber 12, more precisely the flow chamber 24 or its second area 24b, is fluidically connected to a consumer connection 30 or the consumer connection 30 ends in the second area 24b, so that the media reservoir can be connected to the valve 2 by means of hoses. Both the pressure connection and the consumer connection 30 are executed as one piece with the intermediate housing 8 and do not protrude from it. As far as the valve 2 serves to release the air from a media reservoir, the first area 24a of the flow chamber 24 is or can be connected to the atmosphere; when the valve opening 14 is open, the air can flow out of the media reservoir or out of the second area 24b and flow through the connecting channel 24c to the first area 24a, and from there released to the surroundings.

Furthermore, to receive the components necessary for the electric contacting of the printed circuit board 22, such as plug connectors, for example, the intermediate housing 8 has a receiving space 34 which in FIG. 1A is arranged in a back part of the intermediate housing 8 and shown merely dashed.

To guide the actuator 16 while it is being activated, guiding elements formed by the intermediate housing 8 are provided on the one hand. The guiding elements encompass an intermediate wall 36, which starting from the separating wall 28 in an area of the valve opening 14 extends in the direction of movement B into the interior of the actuation chamber 26 and is executed as one piece with the separating wall 28 or the intermediate housing 8. The intermediate wall 36 borders a receiving space 38 for the upper first terminal section 16a facing the valve opening 14. To guide the second terminal section 16b, guiding elements have been integrated into the printed circuit board 22, specifically in form of a recess 40 executed therein, in this case a passage opening into which the second terminal section 16b extends, both in the opening and closing position of the actuator 16. To guide the SMA element 18, the intermediate wall 36 has recesses 27 extending in the direction of movement B.

Thus, to guide the actuator 16 also during an axial movement in the direction of movement B (i.e. while the actuator 16 is being activated), no additional or separate guiding elements in form of further components are necessary.

To close the valve opening 14 reliably in closed position (as shown in FIG. 1A), a closing sealing element 42 that acts together with a sealing seat surrounding the valve opening 14, is arranged on the terminal section 16a facing the valve opening 14.

To control the valve 2 and supply the SMA element 18 with electric current and cause it to shorten, thereby activating the actuator 16, the ends 18a, 18b are electrically connected to the printed circuit board 22, specifically in each case by means of a crimp connector 44. The ends 18a, 18b of the SMA element 18 are in each case attached to a seat 46 of the crimp connector 44 and thus make indirect contact with the printed circuit board 22 via the crimp connector 44. The crimp connectors 44 protrude perpendicularly to the direction of movement B, in each case laterally with a projection $A_1$ above the printed circuit board 22. Furthermore, the crimp connectors 44 extend in stroke direction H from an upper side 22a of the printed circuit board 22 and parallel to it in the direction of the housing bottom 10, i.e. with a projection $A_2$ starting from the upper side 22a of the printed circuit board 22 towards their underside 22b, wherein the seat 46 of the crimp connector 44 ends at a distance from the housing bottom 10 (i.e. is arranged in a free-floating way inside the valve chamber 12). A section 48 of the crimp connector 44 spaced away from the seat 46 is electrically connected to the printed circuit board 22 via clamping elements 50. In doing so, the section 48 can lie flatly both on the upper side 22a and also be slightly spaced away, at least partially, from the upper side 22a. In order to have a connection independent from the tolerances of the printed circuit board 22 or its upper side 22a, the crimp connector 44 or its section 48 can be fully minimally spaced away from the upper side 22a, and the crimp connector 44 is merely supported by the clamping elements 50. Here, each crimp connector 44 has in this case two clamping elements 50 executed essentially as ring-shaped ovals and extending in each case through a recess of the printed circuit board 22 that can be elastically deformed for insertion in the recess and are held there in assembled state in a form- and/or force-fitting way. The crimp connectors 44 thus establish the electrical connection between the ends 18a, 18b of the SMA element 18 and the printed circuit board 22 fixed in place thereon. Thanks to the crimp connectors 44 protruding both laterally and in stroke direction H, it is possible to use an additional length of the SMA element 18, namely the length of the diagonal of an imagined rectangle with the side lengths $A_1$ and $A_2$, to activate the actuator 16 and achieve an overall reduction of the structural height of the valve 2. The printed circuit board 22 itself is contacted with an electrical connection through a plug connector that can be plugged in the receiving space 34 of the intermediate housing 8.

To fasten the printed circuit board 22 inside the valve chamber 12, the intermediate wall 36 integrally executed with the intermediate housing 8 has two deformable projections 52 as fastening elements pre-formed on its front side and extending in assembled state through a passage opening of the printed circuit board 22 and inextricably attached to the printed circuit board 22. At the same time, the front side forms a stopping surface for the printed circuit board 22.

Figure 1B:
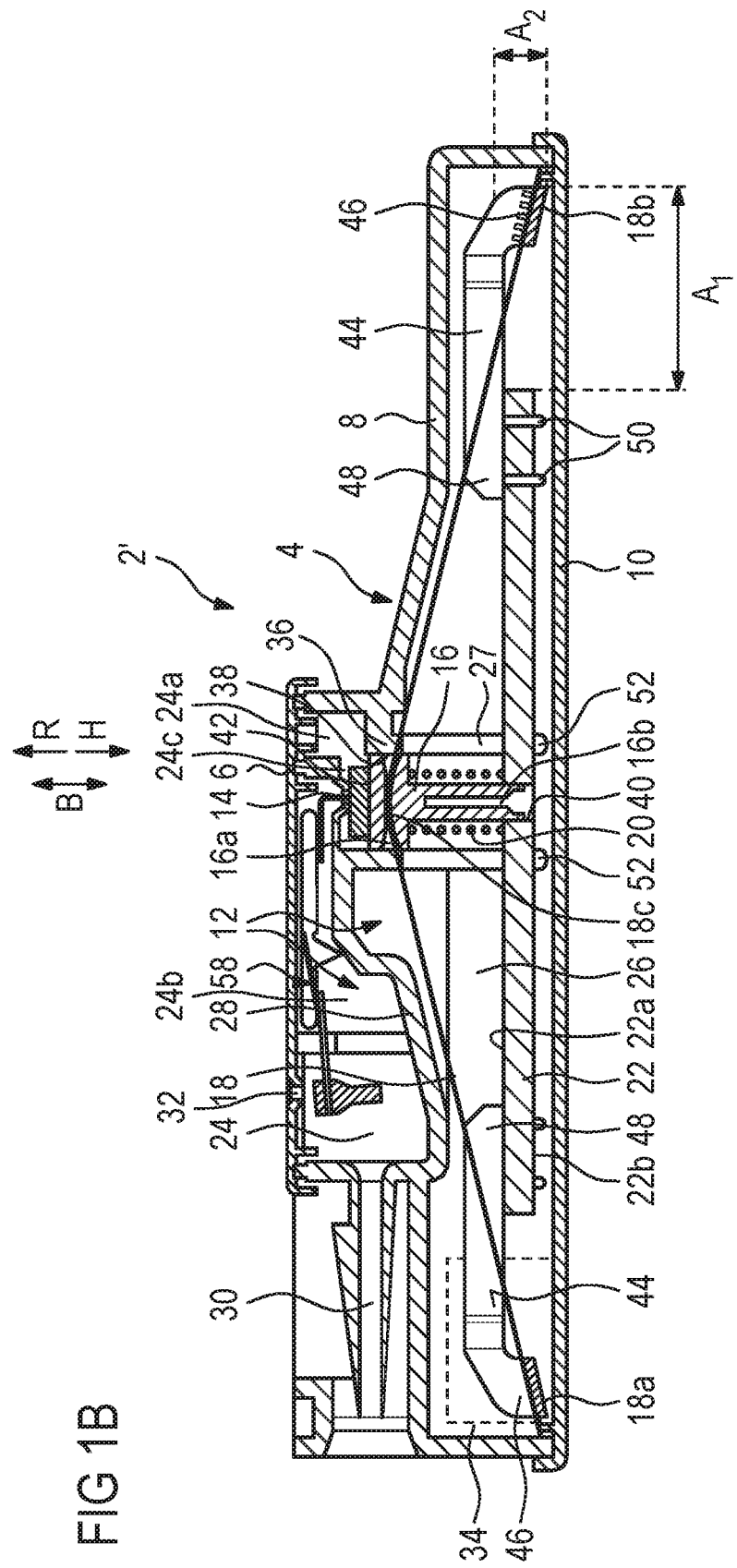
FIG. 1B is a sectional view of a valve according to a second embodiment in closed position.

The valve 2' shown in FIG. 1B is exemplarily executed as 3/2-way valve and thus has another valve opening, specifically an opening 32, which connects the valve chamber 12 with the atmosphere to allow air to flow out from the valve chamber 12. Otherwise, the design of the valve 2' corresponds to that of the valve 2 shown in FIG. 1A ("2/2-way valve"), so that the individual components have the same reference characters. In order to achieve 3/2-way functionality, an actuator 58 has been arranged inside the valve chamber 12 or inside the flow chamber 24, pivoted on the intermediate housing 8 and operatively connected with the actuator 16. The actuator 58 is shown in more detail in FIGS. 5A, 5B. In one section facing the opening 32, the actuator 58 has a sealing element 60 for closing the opening 32. On a terminal section facing the actuator 16, the actuator 58 has a shift finger 62, which is in contact with the actuator 16 or closely fits its sealing element 42. If the actuator 16 is activated and the valve opening 14 is opened, the shift finger 62 is likewise moved in stroke direction owing to a return element 64, here a leaf spring and the actuator 58 is thus rotated around its pivot point, so that the opening 32 is closed by the sealing element 60. If electric current is no longer supplied to the SMA element 18 and since the actuator 16 is moved in return direction R due to the return element 20, the shift finger 62 is likewise moved in return direction R by the actuator 16 or its sealing element 42. As a result of this, and due to a V-shaped pivot point 66 of the actuator 58, the sealing element 60 opens the opening 32. Thus, the opening 32 to the atmosphere is released with the actuator 16 in closed position and closed with the actuator 16 in release position, to ensure that the valve chamber 12 or a media reservoir is always vented when the valve is not activated. Such a 3/2-way valve is used, for example, in a vehicle seat with massaging function, wherein one or several air cushions are in each case cyclically filled and vented.

Figure 2:
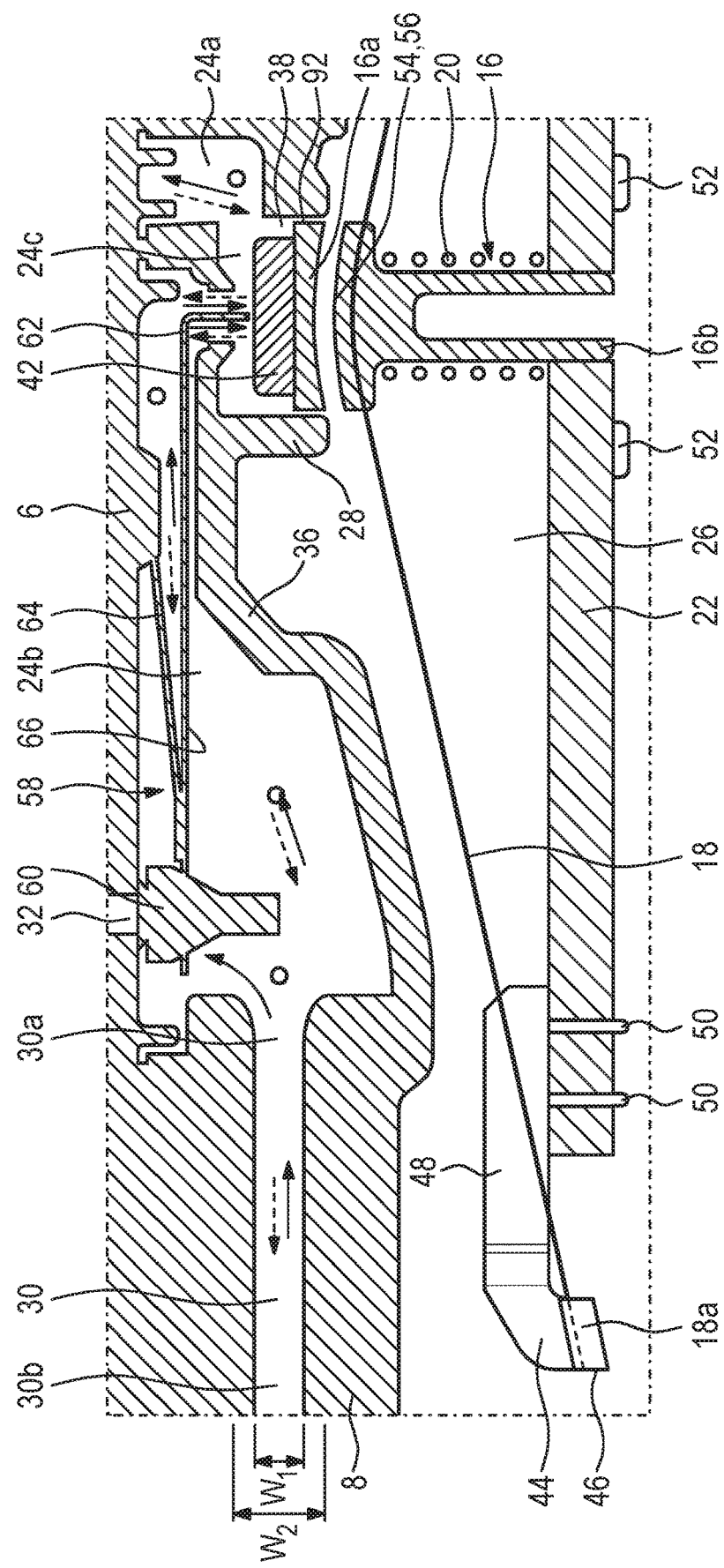
FIG. 2 is a portion of the sectional view of the valve from FIG. 1B in an opening position.
Figure 3A:
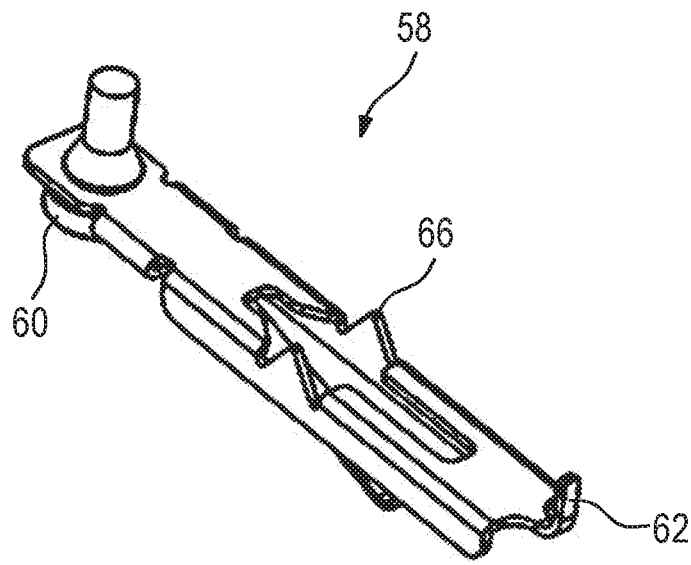
FIGS. 3A, B are respectively top and bottom isometric views of an actuator for closing and releasing the valve opening according to a first embodiment.
Figure 3B:
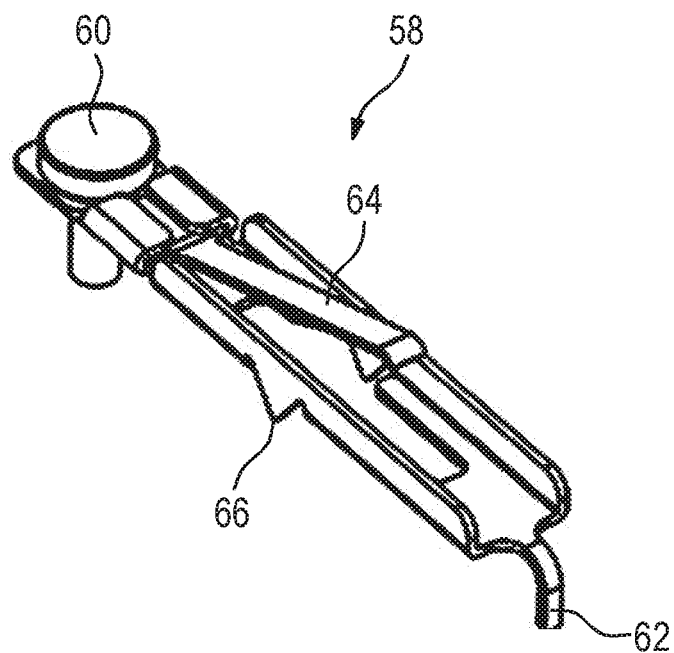

FIG. 2 shows a section of the valve 2' according to FIG. 1B in an opening position, so that a fluid can flow through the connecting channel 24c that connects the first area 24a and the second area 24b of the flow chamber 24 and the valve opening 14. To fill a media reservoir, especially with air, the first area 24a of the flow chamber 24 can be connected to an air supply unit. When the valve opening is closed 14, air is only exchanged between the flow chamber 24 and the actuation chamber 26 via air gaps 92 executed between the separating wall 28 and the actuator 16 and fluidically connect the first area 24a of the flow chamber 24 and the actuation chamber 26 in order to equalize the pressure inside the valve 2' of the valve chamber 12. Here, the air gap 92 ends especially in the receiving space 38 formed by the intermediate wall 36. If the valve opening 14 is opened by activating the actuator 16, the fluid or air flows towards the dashed arrows, from the first area 24a of the flow chamber 24 through the connecting channel 24c and through the valve opening 14 into the second area 24b of the flow chamber 24 and not through the actuation chamber 26. The second area 24b of the flow chamber 24 is connected to the media reservoir or air cushion via the consumer connection 30, thereby filling the media reservoir.

The valve 2' can also be used to empty a media reservoir. If the valve 2' has 3/2-way functionality as shown in FIG. 1B the second area of the flow chamber 24 has an opening 32 to the atmosphere through which the fluid leaves the flow chamber 24 (in the direction of the arrow pointing to the opening 32). If two valves 2 are used to achieve 3/3-way functionality one for filling the media reservoir and the other for emptying it the first area 24a of the flow chamber 24 is connected to the atmosphere or has an opening 32 to it. Thereupon, as soon as the valve opening 14 is open, the fluid or air starts flowing from the media reservoir to the second area 24b of the flow chamber 24 and through the connecting channel 24c to the first area 24a of the flow chamber shown with arrow lines drawn running through the flow chamber 24.

To prevent a turbulent current of the fluid when it enters the consumer connection 30 and thus increase the flow to the media reservoir, a terminal section 30a of the consumer connection facing the second area 24b of the flow chamber 24 has a larger clear width $W_2$ than a terminal section 30b facing the media reservoir that has a smaller clear width $W_1$. Consequently, the consumer connection 30, especially the terminal section 30a, has been executed in the form of a funnel and it is here bordered by the intermediate housing 8 of the flow chamber 24 on the lower side and by the housing lid 6 on the upper side.

The air gaps 92 are arranged in an area surrounding the valve opening 14, here inside the intermediate wall 36 formed by the separating wall 28. This achieves a uniform cooling of the SMA elements, since only a secondary current of the fluid enters the actuation chamber 26 to ensure pressure equalization. To prevent strong turbulences in the actuation chamber 26 and excessive fluid from entering, an opening cross section of the air gap 92 is additionally smaller than an opening of the connecting channel 24c or of the valve opening 14. Furthermore, the opening cross section of the air gap 92 can be selected in such a way that the SMA elements are cooled proportionally to the volume flown. To execute the air gap 92, the first terminal section 16a of the actuator 16 and the sealing element 42 arranged thereto also have a smaller diameter than a clear width of the receiving space 38. Thus, to execute the air channel 92, the sealing element 42 closing the valve opening 14 in the closing position 42 ends laterally spaced apart before the intermediate wall 36 forming the receiving space 38 36. Consequently, when the valve opening 14 is closed, an air exchange is possible between the flow chamber 24 and the actuation chamber 26 via the air gap 92.

The first terminal section 16a of the actuator 16 has at least one passage opening 54 extending perpendicularly to the direction of movement B of the actuator 16, which with regard to the direction perpendicular to the direction of movement B extends through the first terminal section 16a. As far as the actuator 16 only has one such passage opening 54, the SMA element 18 can be guided through this passage opening 54 according to the "needle and thread principle" and reliably held therein. Alternatively, the passage opening 54 can be additionally accessible through a lateral slit 56 extending from one position spaced apart from the passage opening 54 in the direction of movement B of the actuator 16 on an external circumferential surface of the first terminal section 16a towards the passage opening 54, it thus extends obliquely from top to bottom. The middle section of the SMA element 18 is inserted through the slit 56 into the passage opening 54 and is guided in assembled state inside the passage opening 54, thereby preventing the SMA element 18 to slip out and ensuring that it is securely held.

FIG. 4 shows an exploded view of a valve arrangement 100 with several valves 2. Here, the valve arrangement 100 includes a common valve housing for all valves 2. In other words, the valve housing enclosing in each case the valve chamber 12 of a valve 2, specifically both the intermediate housing 108, the housing lid 106 and the housing bottom 110, are executed as one piece; thus, the valve arrangement 100 has a common intermediate housing 108, a common housing lid 106 and a common housing bottom 110, inside of which the respective valve chamber 12 of a valve is executed. Furthermore, the valve arrangement 100 has a common printed circuit board 122 executed as one piece common for all valves 2. This allows the significant reduction of the need for space that the several valves 2 of the valve arrangement 100 need and the number of needed parts and assembly of the valve arrangement 100 compared to currently known valve arrangements.

The valves 2 of the exemplary valve arrangement 100 are essentially executed as the valve 2 described with the help of FIG. 1A, the corresponding components are provided with the same reference characters. In each case, they have, inside the valve chamber 12 between a closed position for closing a valve opening and an opening position to release the valve opening, an axially movable actuator 16, a wire-shaped SMA element 18 that serves to activate the actuator 16 in opening direction and a return element 20 that serves to move the actuator 16 to the closed position. The SMA elements 18 are, in turn, electrically connected to the printed circuit board with their respective ends by means of a crimp connector 44. With a middle section, the SMA elements 18 are in each case fixed to the appropriate actuator 16 to activate it in a stroke direction when electrical current is supplied to it. To do this, the printed circuit board 122 is controlled or electrically contacted via an electric plug connector 168 that can be plugged in a receiving space 34 of the intermediate housing 108. Furthermore, there is a non-return valve 172 exemplarily arranged between the intermediate housing 108 and the housing lid 106, for example in combination with a pressure sensor. Inside the valve housing there is additionally a cushioning foam 174 to reduce the generation of noise, especially when the valves 2 are vented. The intermediate housing 108 has a pressure connection 170 for connection to an air supply unit and four consumer connections 130 for connection to four media reservoirs, especially air cushions of a vehicle seat with contour adjustment.

Figure 6:
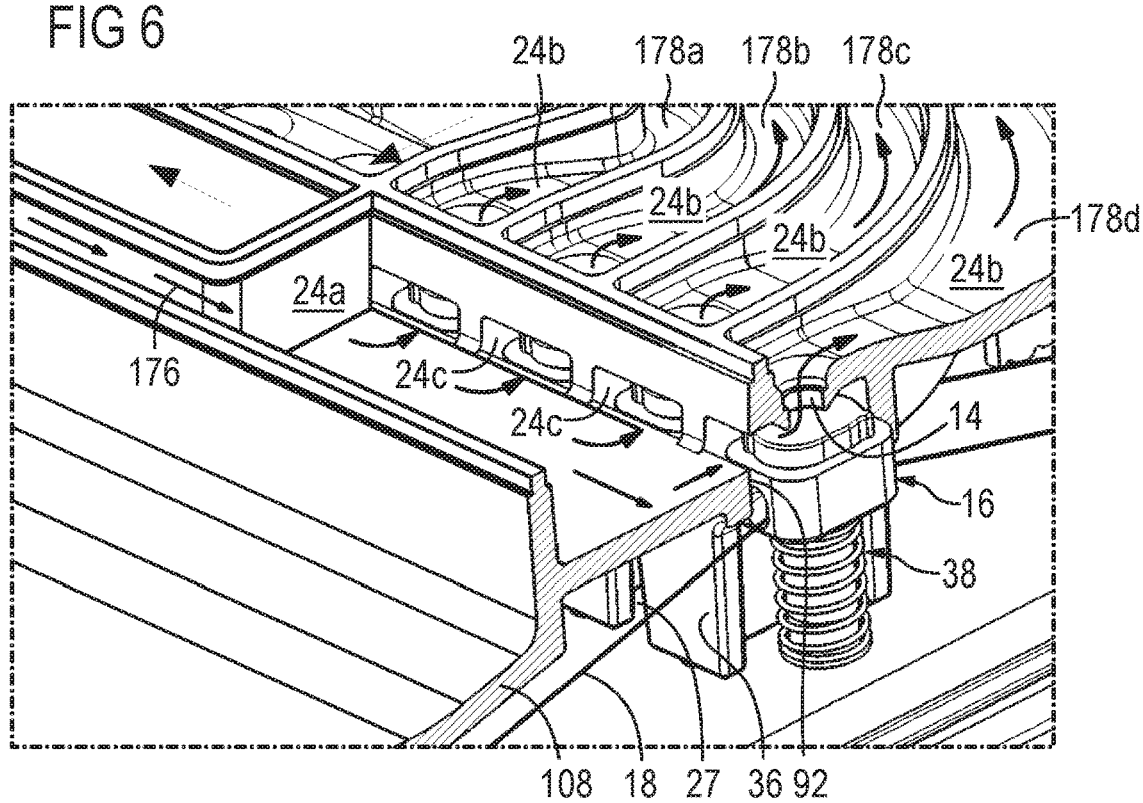
FIG. 6 is a detailed isometric view of the intermediate housing with the actuator from FIG. 5.
Figure 7:
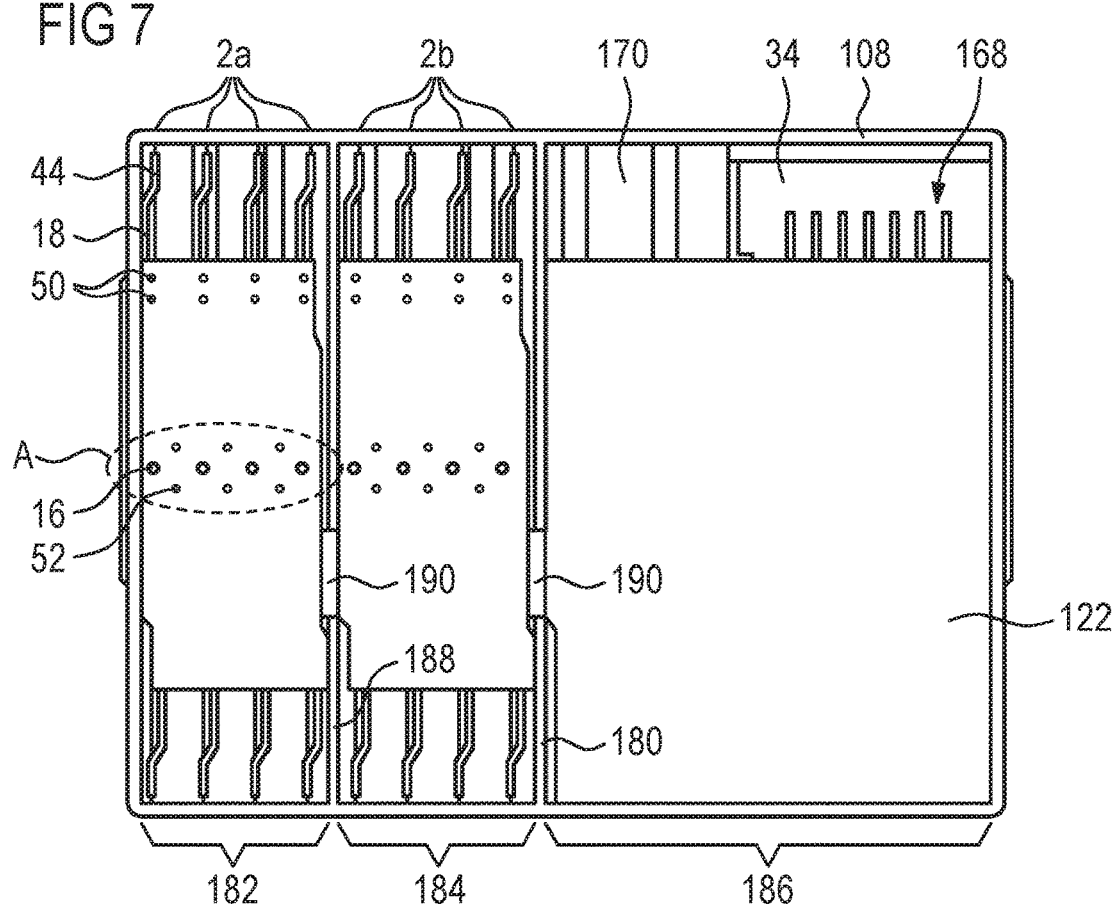
FIG. 7 is a bottom view of the intermediate housing of the valve arrangement according to FIG. 5 with integrated printed circuit board.
Figure 8:
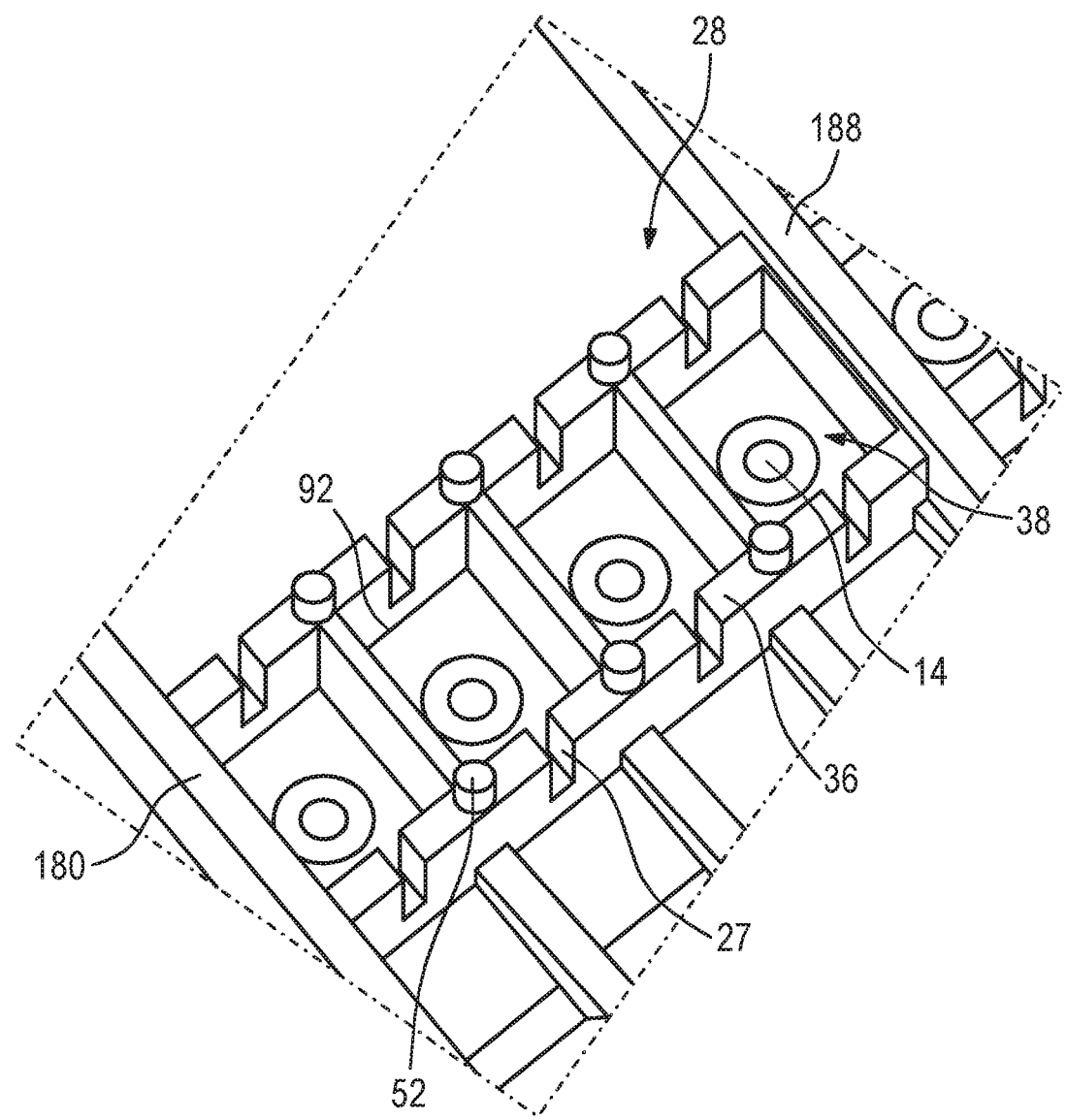
FIG. 8 is a detailed isometric view of an underside of the intermediate housing of the valve arrangement according to FIG. 5 without printed circuit board.

FIG. 5 shows a top view of the intermediate housing 108 of the valve arrangement from FIG. 4, FIG. 6 a section of the intermediate housing 108, and FIG. 7 shows a view of the intermediate housing 108 from below with mounted printed circuit board 122. FIG. 8 shows the section A of the intermediate housing 108 in a view from below without printed circuit board. Air (indicated by dotted arrows) is supplied to the flow chambers, more precisely to the first areas 24a of the flow chambers of a first part of the valve 2, here four valves 2a, via a joint pressure connection 170, which can be connected to a pneumatic pump through an air channel 176 formed by the intermediate housing 108 and bordered by the intermediate housing 108 on its upper side.

Between the pressure connection 170 and an area 182, a non-return valve 172 is arranged inside the air channel 176. The first areas 24a of the valves 2a form the area 182 together, in which the air channel 176 ends, i.e. the final section of the air channel 176. However, it could also be conceivable to separate the first areas 24a in each case by separating walls, so that the first areas 24a form in each case a terminal section of the air channel 176. Air flowing into the first areas 24a is largely held in the first areas 24a when the valve opening 14 is closed. However, a little air is exchanged through the air gaps 92 between the flow chamber 24 or the first areas 24a and the respective actuation chamber 26 of the valve 2 to ensure pressure compensation. In addition, the dimension of the gap allows the desired cooling of the SMA elements 18 to be adjusted or heat from the actuation chamber 26 to be dissipated. If the valve opening 14 is released, air flows from the first area 24a of the flow chamber via the connecting channel 24c through the valve opening 14 into the second area 24b or farther via air channels 178a, b, c, d to consumer connections 130a, b, c, d for (in this case) four media reservoirs or air cushions (see FIG. 6 solid arrows).

A second part of the valves 2 (here four valves 2b) has a joint opening 132 to the atmosphere executed in the housing lid 106 (see FIG. 4) and connected to the atmosphere via the first areas 24a of the flow chambers 24 of the second part of the valves 2b or an area 184 encompassing the first areas 24a of the valves 2b. When a media reservoir is vented, the air inside it flows at first through the respective consumer connection 130a, b, c, d to the air channels 178a, b, c, d or the second areas 24b and then through the opened valve opening 14 of the valves 2b as well as the connecting channel 24c to the area 184 (see FIG. 6 dotted arrows). Air is also exchanged here between the area 184 and the actuator chambers 26 of the valves 2b via the air gaps 92 when the valve opening 14 is open.

The second areas 24b of the flow chambers of a first valve 2a and a second valve 2b are in each case fluidically connected to one another in pairs as well as to one of the four consumer connectors 130a, b, c, d shown here for four media reservoirs or air cushions. In this case, one of the air channels or air chambers 178a, b, c, d is allocated to each media reservoir or air cushion, wherein the separating walls 180, 188 separating the air channels 178a, b, c, d just like the areas 182, 184 and the areas 184, 186 from one another are, in turn, integrally executed with the intermediate housing 108 or formed by it. In other words, in each case, one first valve 2a and a second valve 2b are allocated to one media reservoir and connected to it, wherein the first valve 2a serves to fill the media reservoir with air and the second valve 2b serves to empty the media reservoir. This combination of filling and venting by air channels 178a, b, c, d executed in the intermediate housing 108 achieves a 3/3-way functionality of the valve arrangement 100. Thus, with regard to the overall airflow, the valve arrangement 100 divided into three areas, one pressure area 182 connected to the pneumatic pump and in which the valves 2a or their first areas 24a are arranged, a venting area 184 connected to the atmosphere via opening 132 and in which the first areas 24a of the valves 2b are arranged, and an electronics area 186 that contains the essential electronic parts. Pressure sensors (not shown) could be provided both in the pressure area 182 and venting area 184 or electronics area 186 so conclusions can be drawn for the respective pressure in the air cushions.

The pressure area 182, the venting area 184 and the electronics area 186 are in each case separated from one another by the separating walls 180, 188 formed by the intermediate housing 108 and pneumatically sealed against one another. To achieve a sealed transition 190 of the printed circuit board 122 between the pressure area 182 and the venting area 184, and between the venting area 184 and the electronics area 186, an adhesive is applied on the transition 190 in the separating wall 180, 188 through an opening in the printed circuit board 122, distributed in the intermediate area between the printed circuit board 122 and separating wall 180, 188 and can, for example, be hardened with UV light.

To attach the printed circuit board 122 to the intermediate housing 108, it has projections 52 formed on a front side of the intermediate walls 36 that form the receiving spaces 38 (FIG. 8) and in the assembled state extend via recesses of the printed circuit board 122 and inextricably fixed in place therein (FIG. 7).

Figure 11:
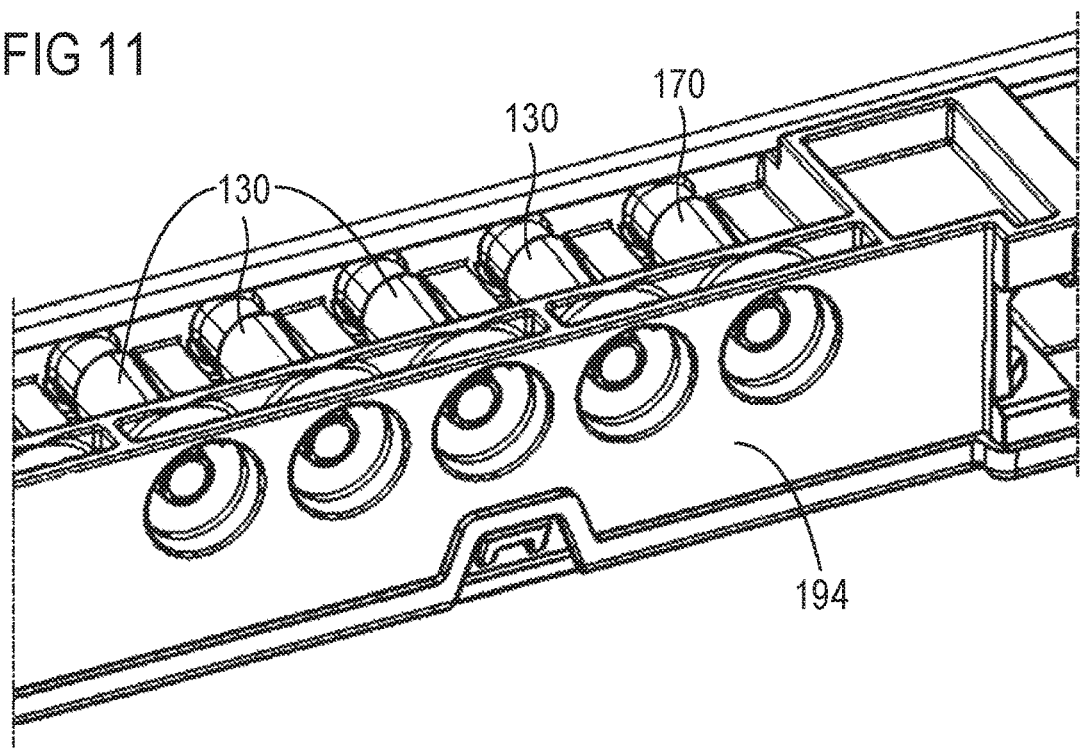
FIG. 11 is a detailed isometric view of an intermediate housing with a support device.
Figure 12A:
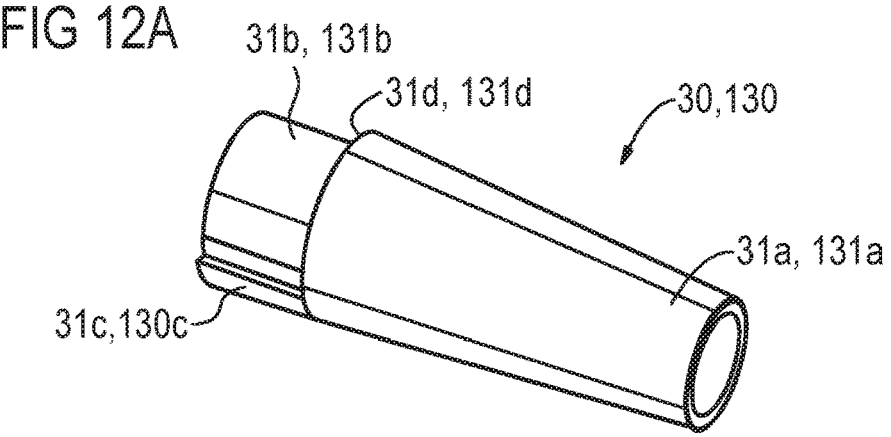
FIGS. 12A-C are respectively isometric, end and side views of a connecting piece.
Figure 12B:
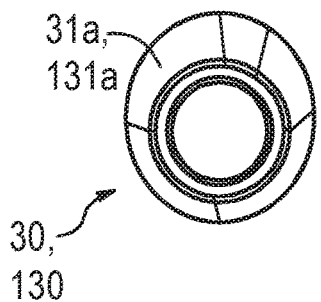
Figure 12C:
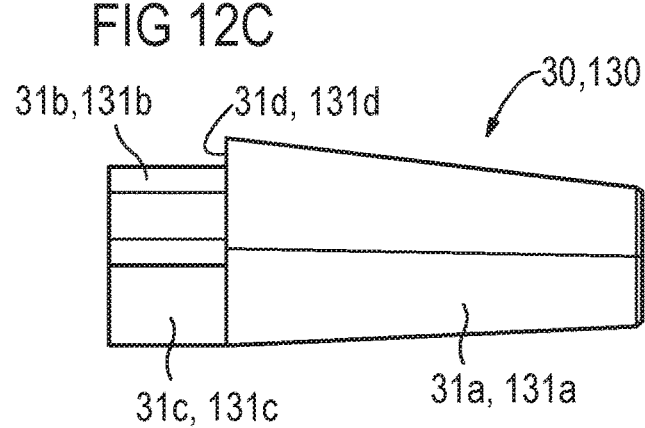

The pneumatic pump and the media reservoirs are connected to the valve arrangement through hoses, which are slipped on the pressure connection 170 or the consumer connections 130a, b, c, d. To protect the pressure connection 170 or the consumer connections 130a, b, c, d (which are here fully arranged inside the intermediate housing 108 and do not protrude from it) from mechanical influences, a support device 194 has been integrated into the intermediate housing 108, through which the hoses can be inserted and connected to the connectors (see also FIG. 11). The support device 194 is exemplarily a metal sheet that partially comprises the pressure connection 170 and the consumer connections 130a, b, c, d with an opening through which a hose can be inserted for connection to the connections. In a valve arrangement 100 having such a support device 194, the wall thickness of the cylindrically formed connections can, for example, be reduced, which in turn increases the flow of the valve 2. FIGS. 12A to 12C show exemplarily a consumer connection 30, 130, a pressure connection 170 has a corresponding form. The consumer connection 30, 130 has a first terminal section 31a, 131a facing away from the valve chamber 12 and tapering off to a free end. Connected to it, a largely elliptical second terminal section 31b, 131b, 31c, 131c facing towards the valve chamber has been provided. Here, the circumferential section 31c, 131c has a larger outer diameter compared to the circumferential section 31b, 131b, i.e. it is radially widened. In assembled state, the widened circumferential section 31c, 131c is arranged on the underside of the connecting piece 30, 130. As a result of this, a rear grip surface 31d, 131d has been executed between the first terminal section 31a, 131a and the second terminal section 31b, 131b, 31c, 131c to ensure a secure seat of the hose inserted on the connection 30, 130 and secures it against being pulled off. Thus, not only does the inner width of the consumer connection vary to improve the flow (as shown in FIG. 2) but also the external diameter, in order to ensure a reliable mechanical fastening of the hoses.

Figure 9:
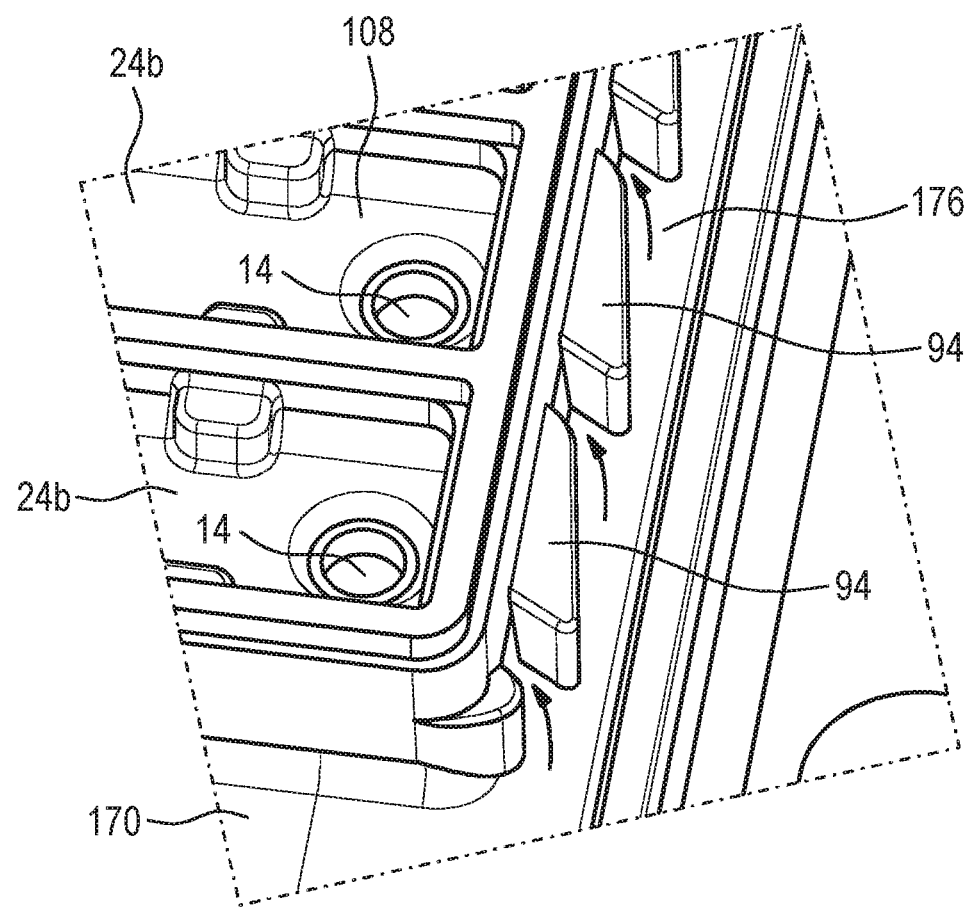
FIG. 9 is a detailed isometric view of an air channel inside the intermediate housing leading to the flow chambers.

FIG. 9 shows a section of the air channel 176 inside the intermediate housing 108 leading from the air supply unit or the pressure connection to the flow chambers 24. Guiding elements 94 in form of guide vanes have been arranged in the air channel 176. As a result of this, the fluid or its current flowing from the air supply unit through the air channel 176 is guided before entering the respective first areas 24a of the flow chambers 24 or before entering the valve chambers 24c, thereby preventing turbulences, which in turn reduces the higher flow of the valve 2, 2' or of the valve arrangement 100 and lowers unnecessary noise development.

Figure 10:
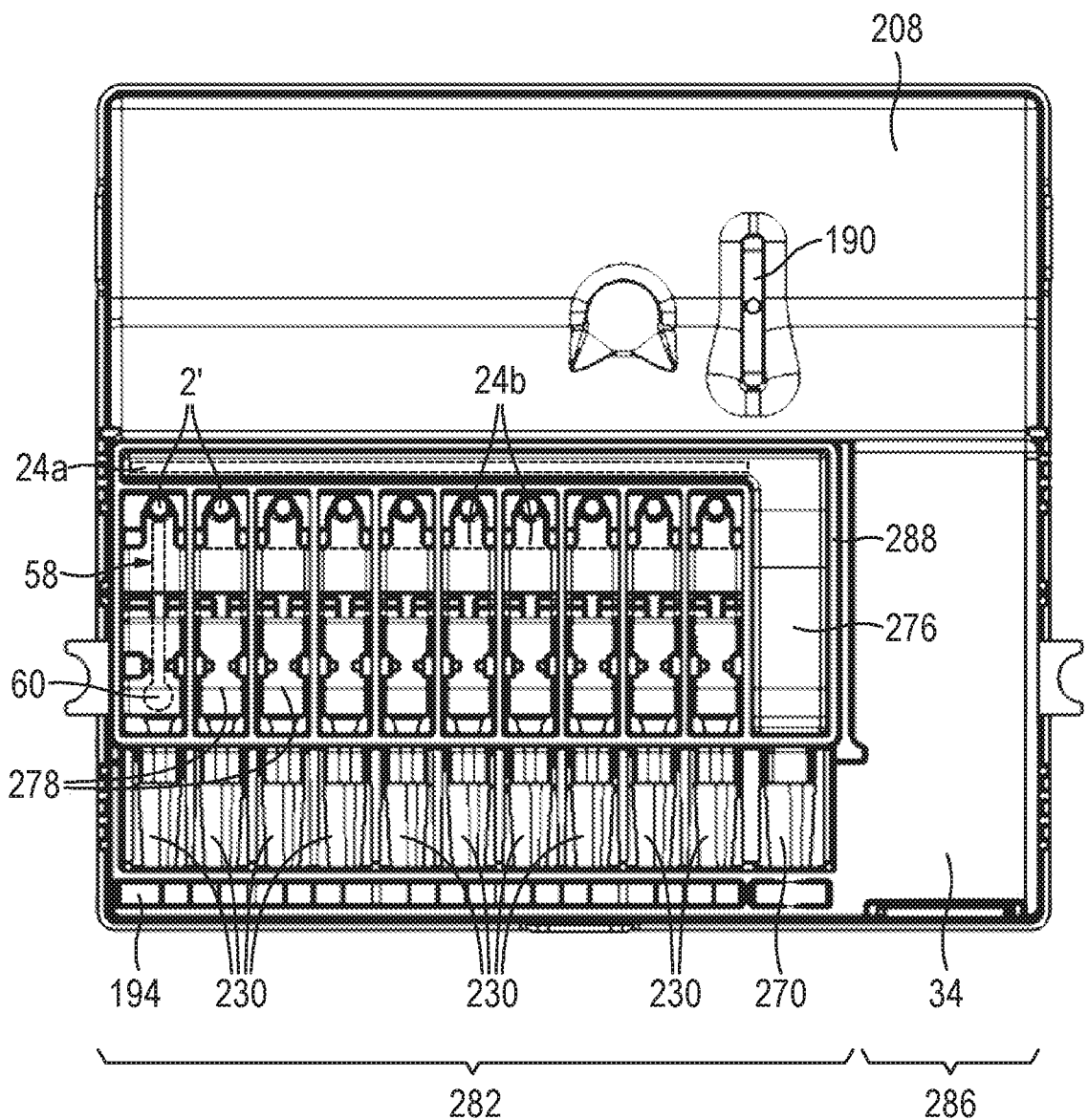
FIG. 10 is a top view of an intermediate housing of a valve arrangement according to a second embodiment.

FIG. 10 shows an intermediate housing 208 according to another embodiment, namely for a valve arrangement that has several valves 2' executed according to FIG. 1B (i.e.

3/2-way valves), used for example for performing a massaging function of a vehicle seat, thus for the cyclical ventilation and venting of several air cushions. It is mentioned here that the other components of the valve arrangement correspond essentially to those of the valve arrangement 100 described above. By selecting the intermediate housing 108 or 208 and thus the arranged air channels, a desired functionality massage or static adjustment can be achieved.

The intermediate housing 208 has a common pressure connection 270 through which all valves 2' can be connected to a pneumatic pump, wherein the pressure connection 270 is connected in each case to the first areas 24a of the flow chambers 24 of the valves 2' through an air channel 276 formed inside the intermediate housing 208 or ends in them. For reasons of clarity, the actuator 58 is shown dashed only for one of the valves 2'. An opening to the atmosphere for each valve 2' has been executed in the housing lid that connects the second areas 24b of the flow chambers with the atmosphere (see FIG. 1B). One media reservoir has been allocated to each valve 2' with which the respective valve 2' or its second area 24b is connected via an air channel 278 and consumer connections 230 that can be executed, in turn, according to FIGS. 12A-C.

In such an executed intermediate housing 208, the valve arrangement has a connected pressure area 282, separated from an electronics area 286, in turn, by a separating wall 288. A transition 190 of the printed circuit board between the pressure area 282 and the electronics area 286 is also pneumatically sealed here according to the previous designs.

To fill a media reservoir, air flows through the air channel 276 into the first areas 24a or into the area 282 encompassing the first areas 24a and as is also the case with the intermediate housing 108 through air gaps 92 into the actuation chamber 26. If the valve opening 14 is opened, air flows out of the first area 24a via the connection channel 24c through the valve opening 14 into the second area 24b and from there, possibly through additional air channels not shown here, through the consumer connections 230 to the respective media reservoir. At the same time, the actuator 58 is moved, so that the opening 32 is closed. To vent the media reservoir, the valve opening 14 is closed by moving the actuator 16 to return position. This, in turn, also moves the actuator 58, thereby releasing the opening 32. As a result of this, owing to the excess pressure prevailing in the media reservoir, the air trapped therein starts flowing out of the valve 2' through the opening 32. Also in this intermediate housing 208, the air channels 276 and the area 282 are formed by the intermediate housing itself as well.

| List of reference characters | | |
|---|---|---|
| 2, 2a, 2b | | Valve |
| 4 | | Valve housing |
| 6 | | Housing lid |
| 8 | | Intermediate housing |
| 10 | | Housing bottom |
| 12 | | Valve chamber |
| 14 | | Valve opening |
| 16 | | Actuator |
| 16a | | First terminal section of the actuator |
| 16b | | Second terminal section of the actuator |
| 18 | | SMA element |
| 18a | | First end of the SMA element |
| 18b | | Second end of the SMA element |
| 18c | | Medium section of the SMA element |
| 20 | | Return element (soil spring) |
| 22 | | Printed circuit board |
| 22a | | Upper side of the printed circuit board |
| 22b | | Lower side of the printed circuit board |
| 24 | | Flow chamber |
| 24a | | First area of the flow chamber |
| 24b | | Second area of the flow chamber |
| 24c | | Connecting channel |
| 26 | | Actuation chamber |
| 28 | | Separating wall |
| 30, 130, 230 | | Consumer connection |
| 30a, 30b | | Terminal sections of the consumer connection |
| 31a, b, c, d | | Sections of the consumer connection |
| 32 | | Opening |
| 34 | | Receiving space |
| 36 | | Intermediate wall |
| 38 | | Receiving space |
| 40 | | Recess |
| 42 | | Sealing element |
| 44 | | Crimp connector |
| 46 | | Seat of the crimp connector |
| 48 | | Section of the crimp connector |
| 50 | | Clamping element |
| 52 | | Projection |
| 54 | | Passage opening |
| 56 | | Slit |
| 58 | | Actuator |
| 60 | | Sealing element |
| 62 | | Shift finger |
| 64 | | Return element |
| 66 | | Turning point |
| 92 | | Air gap |
| 94 | | Guiding element |
| 100 | | Valve arrangement |
| 106 | | Housing lid |
| 108, 208 | | Intermediate housing |
| 110 | | Housing bottom |
| 116 | | Actuator |
| 131a, b, c, d | | Sections of the consumer connections |
| 168 | | Plug connector |
| 170, 270 | | Pressure connection |
| 172 | | Non-return valve |
| 174 | | Cushioning foam |
| 176, 276 | | Air channel |
| 178a, b, c, d, 278 | | Air channels |
| 180 | | Separating wall |
| 182 | | Pressure area |
| 184 | | Venting area |
| 186 | | Electronics area |
| 188, 288 | | Separating wall |
| 190 | | Bonding spot |
| B | | Direction of movement of the actuator |
| H | | Stroke direction |
| R | | Return direction |
| $A_1$ | | Lateral projection of the crimp connector |
| $A_2$ | | Axial projection of the crimp connector |
| $W_1$ | | Clear width of the terminal section 30b |
| $W_2$ | | Clear width of the terminal section 30a |

The invention claimed is:

1. A valve comprising:
 a valve housing including a housing lid, a housing bottom, and an intermediate housing between the housing lid and the housing bottom, the housing lid, the housing bottom, and the intermediate housing collectively defining therein a valve chamber including a flow chamber, an actuation chamber, a valve opening between the flow chamber and the actuation chamber, and wherein inside the actuation chamber are:
  at least one actuator that is axially movable between a closing position to close the valve opening and an opening position to open the valve opening;
  an SMA element made of a shape memory alloy that serves to activate the actuator in an opening direction toward the opening position;
  a return element that serves to move the actuator in a closing direction toward the closing position; and
  a printed circuit board, the SMA element having two ends and a middle section, the SMA element being attached to the actuator at the middle section and being electrically connected at the ends to the printed circuit board for supply of an electrical current;
 wherein the flow chamber and the actuation chamber are separated by a separating wall, wherein the valve opening is defined in the separating wall so that, when the actuator is activated by the SMA element, a fluid flowing through the valve flows through the flow chamber.

2. The valve according to claim 1, wherein a first area of the flow chamber and a second area of the flow chamber is connected via at least one of the valve opening and a connecting channel, wherein the at least one of the valve opening and the connecting channel is closed when the actuator is in the closing position and is released when the actuator is in the opening position.

3. The valve according to claim 2, wherein at least one of the first area of the flow chamber may receive a supply of air from an air supply unit and the second area of the flow chamber is connectable to a media reservoir.

4. The valve according to claim 3, wherein a terminal section of a consumer connection facing the second area of the flow chamber has a larger clear width than a clear width of a terminal section facing the media reservoir.

5. The valve according to claim 3, wherein the flow chamber is connectable to atmosphere via an opening to the atmosphere to let air out of the flow chamber.

6. The valve according claim 5, wherein the actuator includes a first actuator, and a second actuator is arranged inside the valve chamber, the second actuator being pivotable on the intermediate housing and coupled with the actuator so that the opening to the atmosphere is opened when the first actuator is in the closing position and the opening is closed when the first actuator is in the opening position.

7. The valve according claim 2, wherein the flow chamber and the actuation chamber are fluidically connected via at least one air gap.

8. The valve according to claim 7, wherein a cross section of the at least one air gap is smaller than at least one of a cross section of the connecting channel and a cross section of the valve opening.

9. The valve according to claim 8, wherein the cross section of the at least one air gap is configured so that that the SMA element is cooled proportionally to a volume of a flow through the air gap.

10. The valve according to claim 7, wherein the separating wall has an intermediate wall extending at least partially around the valve opening and into the actuation chamber in a direction of movement of the actuator and configured as a receiving space for the actuator, the actuator being guided into the receiving space.

11. The valve according to claim 10, wherein the actuator has a sealing element on a first terminal section facing the valve opening for closing the valve opening, the sealing element being spaced from the intermediate wall to form the at least one air gap.

12. The valve according to claim 1, wherein the separating wall is formed by the intermediate housing.

13. A valve arrangement including several of the valves according to claim 1, wherein at least one of the valve housings and the printed circuit boards of the valves are executed as one piece.

14. The valve arrangement according to claim 13, further including a common pressure connection for at least a first portion of the valves ending in the valve chamber directly or via at least one air channel.

15. The valve arrangement according to claim 14, wherein the first portion and the second portion of the valves are separated by a separating wall.

16. The valve arrangement according to claim 13, wherein the valves have a common pressure connection ending in the valve chamber directly or via at least one air channel, and wherein each valve has a separate opening for connection to the atmosphere.

17. The valve arrangement according to claim 13, wherein the valve chambers of the valves are separated from a receiving space by a separating wall for the electronic contacting of the printed circuit board.

18. The valve arrangement according to claim 13, wherein guiding elements located in one air channel leading from the air supply unit to the flow chambers guide fluid to flow with a laminar flow.

19. The valve arrangement according to claim 13, wherein at least a second portion of the valves has a common opening for connection to the atmosphere.

* * * * *